UNITED STATES PATENT OFFICE.

FRANCIS LAIRD STEWART, OF MURRAYSVILLE, PENNSYLVANIA, ASSIGNOR OF ONE-HALF TO SAMUEL E. GILL, OF PITTSBURG, PENNSYLVANIA.

METHOD OF MAKING MAIZE-SUGAR.

No. 811,523. Specification of Letters Patent. Patented Jan. 30, 1906.

Application filed October 17, 1904. Serial No. 228,781.

*To all whom it may concern:*

Be it known that I, FRANCIS LAIRD STEWART, of Murraysville, in the county of Westmoreland and State of Pennsylvania, have invented a new and useful Improvement in the Manufacture of Sugar, of which the following is a full, clear, and exact description.

I have discovered that when maize, the Indian-corn plant, is in the growing condition it can be caused by sterilization or the severing of the ear from the stalk at a certain stage of its growth, as hereinafter indicated, to enter upon and pass through a new and peculiar condition of development, whereby, as one of the direct results of the treatment, the plant is enabled to store and accumulate within the cells of the stalk an extraordinary proportion of sugar (amounting to twelve to fifteen per cent. of the juice) and to produce at the same time such changes in its cellular structure as to enable it to be utilized practically for the manufacture of sugar and cellulose and other useful and valuable products derived from them. The treatment of the living plant necessary to produce these results may be described as follows: The development of the grain must be arrested at a certain critical point, which should not be overpassed, the particular external indications of which, taken together, are the yet bright green color of the outside layers of the husk of the ear, the but partially developed grains at the tip of the ear filled with the watery juice, and the brown dead silk protruding from the tip of the ear. If the husk be stripped from the ear when this stage of its development has been reached, the grain, except at the top of the ear, will be found to be filled with a milky juice. The best results are to be reached only when the development has reached this critical stage and are not reached at all if the separation of the ear is postponed until the grain has hardened. In practice the end is attained by simply stripping off the ear from the stalk when the proper period has been reached or by breaking or cutting through the fibrous internal vessels of the foot-stalk of the ear, so as to prevent their supplying it with the nourishment stored in the stalk. The ear may be allowed to remain hanging to the side of the stalk, attached to it only by the external membranes of the foot-stalk. This treatment of the plant is constant and uniform in producing the results as above stated. I have ascertained this by several years of experiment with most of the varieties of maize now grown in the United States and under very diverse conditions of soil and climate. Under the new conditions of treatment and development the life of the plant is greatly prolonged, and the juice of the stalk acquires entirely new characteristics never obtained when in the normal condition. This discovery put to practical use gives a new source of supply for sugar and cellulose in unlimited quantity, of superior quality, and at a comparatively low cost. Moreover, these results are reached without the sacrifice of the grain, for a full crop of the immature grain is secured for stock-feeding or other uses.

After the ears have been stripped from the stalk at the period above stated the stalk is allowed to grow for a considerable period of time until it reaches its full development. This will require from two to four weeks, the time varying somewhat with the variety of maize under treatment. The stalk is then in prime condition for use and will contain about fourteen per cent. of sugar. It should then be cut, the juice extracted and clarified and converted into sugar or syrup. The residue of the stalk can be used as cellulose for the manufacture of paper and other uses.

While I have indicated particularly the stage of the growth of the plant at which the ears are to be removed, the treatment may be varied. Thus I may obtain the same result in a measure by sterilizing the plant in other ways—for example, by removing the ear as soon as it is formed or by lopping off the panicle.

I take the juice extracted from the stalk, which is then in a somewhat-diluted condition, about twenty-five per cent. of water having been added to it during the process of extraction or directly afterward. This measure of dilution is desirable to facilitate the precipitation of certain impurities at a subsequent stage of the operation. As soon as the juice has been extracted from the stalk, or, preferably, during the process of extraction, as a preparatory step to prevent immediate and more or less destructive change to the sugar in the juice thus exposed to the action of the air I add formic aldehyde, (or formaldehyde,) which I incorporate with the fresh juice, using it for that purpose in the proportion of about one pound of a forty-per-cent. solution of formaldehyde, such as is known commercially as "formaldehyde Merck," to one thousand gallons of the juice. The juice is then run off into a heating-tank, and when its temperature has reached about 180° Fahrenheit, or such temperature under varying conditions as will produce coagulation of the albuminous substances which are coagulable at that stage, I add to it a compound prepared by adding to a saturated solution of acetate of alumina about one-half its weight of calcined magnesia, (magnesium oxid.) Carbonate of magnesia may be substituted in part for the oxid. This compound is added slowly to the juice until it shows an alkaline reaction to test-paper. The juice is then heated to or near the boiling temperature, the heat turned off, and the precipitate which is formed allowed to subside. The liquid is then racked off into another tank, and enough of a solution of acid sulfite of magnesia, or acid sulfite of alumina, is mixed with it until it shows an acid reaction on test-paper. The juice is then ready for evaporation, first in open evaporating-pans, using a filter-press afterward for the separation of any sediment that may form, and, as it then is in a highly-clarified condition, it is finally reduced in a vacuum apparatus to the condition of crystallized sugar or a purified syrup.

I make no claim to any apparatus to be used for evaporating purposes, but may use the best forms of such apparatus now employed in cane and beet sugar manufacture.

I claim—

1. The method herein described which consists in sterilizing maize before the close of the milky period of the kernel, continuing the growing of the plant to permit an increase of sugar content in the stalk, then extracting the juice, clarifying it and reducing it to sugar or syrup; substantially as described.

2. The method herein described which consists in separating the ears from growing field-maize while the ears are in the milk, continuing the growing of the plant to permit an increase of sugar content in the stalk, then extracting the juice, clarifying and reducing it to sugar or syrup; substantially as described.

3. The method herein described which consists in sterilizing maize when the ear is in the milk, continuing the growing of the plant for more than two weeks until an increase of sugar content takes place in the stalk, then extracting the juice, clarifying it and reducing it to sugar or syrup; substantially as described.

4. The method herein described which consists in separating the ears from growing maize while the ears are still immature and are at the stage of growth, at which the ear is in the milk and the protruding silk is dead, continuing the growing of the plant until an increase of sugar content takes place in the stalk, then extracting the juice, and clarifying it and reducing it to sugar or syrup; substantially as described.

In testimony whereof I have hereunto set my hand October 8, 1904.

FRANCIS LAIRD STEWART.

Witnesses:
GEO. B. BLEMING,
T. W. BAKEWELL.